United States Patent
Ridel et al.

(10) Patent No.: US 9,497,614 B1
(45) Date of Patent: Nov. 15, 2016

(54) NATIONAL TRAFFIC STEERING DEVICE FOR A BETTER CONTROL OF A SPECIFIC WIRELESS/LTE NETWORK

(71) Applicant: F5 Networks, Inc., Seattle, WA (US)

(72) Inventors: Leonid Ridel, Hod HaSharon (IL); Petrus Wilhelmus Andrianus Jacobus Maria Nas, The Hague (NL)

(73) Assignee: F5 Networks, Inc., Seattle, WA (US)

(*) Notice: Subject to any disclaimer, the term of this patent is extended or adjusted under 35 U.S.C. 154(b) by 0 days.

(21) Appl. No.: 14/194,268

(22) Filed: Feb. 28, 2014

Related U.S. Application Data

(60) Provisional application No. 61/770,473, filed on Feb. 28, 2013.

(51) Int. Cl.
*H04W 4/00* (2009.01)
*H04W 8/04* (2009.01)
(Continued)

(52) U.S. Cl.
CPC .............. *H04W 8/04* (2013.01); *H04W 36/14* (2013.01); *H04W 48/16* (2013.01)

(58) Field of Classification Search
CPC ................. H04W 24/08; H04W 24/10; H04W 28/00; H04W 28/02; H04W 28/16; H04W 36/00; H04W 40/00; H04W 40/02; H04W 40/12; H04W 48/18; H04W 4/24; H04W 76/002; H04W 76/02; H04W 75/022; H04W 76/041
(Continued)

(56) References Cited

U.S. PATENT DOCUMENTS 5,282,201 A    1/1994   Frank et al.
5,550,816 A    8/1996   Hardwick et al.
(Continued)

FOREIGN PATENT DOCUMENTS

CA    2080530 A1    4/1994
EP    0605088 A3    2/1996
(Continued)

OTHER PUBLICATIONS

Baer, T., et al., "The elements of Web services" ADTmag.com, Dec. 1, 2002, pp. 1-6, (http://www.adtmag.com).
(Continued)

*Primary Examiner* — Jean Gelin
(74) *Attorney, Agent, or Firm* — LeClairRyan, a Professional Corporation

(57) ABSTRACT

This technology discloses a controlling and steering device for maintaining national connection between a mobile device of a subscriber and a mobile network. The system comprises: a tracing module, a steering logic module and a communication module. The tracing module is configured to: (i) periodically sample a mobile device of a subscriber or a location of the mobile device; and (ii) check amount of data sent and received from the mobile device is below a specified threshold. The steering logic module is configured to determine if a national connection between a mobile device of a subscriber via a Mobility Management Entity (MME) and a mobile network via a Home Subscriber Server (HSS) is permitted and wherein the communication module is arranged to send and receive messages from HSS to MME and from MME to HSS.

34 Claims, 7 Drawing Sheets

(51) Int. Cl.
*H04W 36/14* (2009.01)
*H04W 48/16* (2009.01)

(58) Field of Classification Search
USPC ............... 455/432.3, 434, 435.1, 436, 452.1, 455/452.2, 453
See application file for complete search history.

(56) References Cited

U.S. PATENT DOCUMENTS

| | | |
|---|---|---|
| 5,606,665 A | 2/1997 | Yang et al. |
| 5,623,490 A | 4/1997 | Richter et al. |
| 5,991,302 A | 11/1999 | Berl et al. |
| 5,995,491 A | 11/1999 | Richter et al. |
| 6,026,500 A | 2/2000 | Topff et al. |
| 6,029,175 A | 2/2000 | Chow et al. |
| 6,041,365 A | 3/2000 | Kleinerman |
| 6,047,356 A | 4/2000 | Anderson et al. |
| 6,067,558 A | 5/2000 | Wendt et al. |
| 6,104,706 A | 8/2000 | Richter et al. |
| 6,154,777 A | 11/2000 | Ebrahim |
| 6,157,950 A | 12/2000 | Krishnan |
| 6,259,405 B1 | 7/2001 | Stewart et al. |
| 6,260,070 B1 | 7/2001 | Shah |
| 6,292,832 B1 | 9/2001 | Shah et al. |
| 6,304,913 B1 | 10/2001 | Rune |
| 6,330,574 B1 | 12/2001 | Murashita |
| 6,338,082 B1 | 1/2002 | Schneider |
| 6,353,848 B1 | 3/2002 | Morris |
| 6,363,056 B1 | 3/2002 | Beigi et al. |
| 6,370,527 B1 | 4/2002 | Singhal |
| 6,389,462 B1 | 5/2002 | Cohen et al. |
| 6,446,108 B1 | 9/2002 | Rosenberg et al. |
| 6,466,580 B1 | 10/2002 | Leung |
| 6,469,983 B2 | 10/2002 | Narayana et al. |
| 6,513,061 B1 | 1/2003 | Ebata et al. |
| 6,514,085 B2 | 2/2003 | Slattery et al. |
| 6,542,936 B1 | 4/2003 | Mayle et al. |
| 6,560,230 B1 | 5/2003 | Li et al. |
| 6,578,069 B1 | 6/2003 | Hopmann et al. |
| 6,615,267 B1 | 9/2003 | Whalen et al. |
| 6,631,422 B1 | 10/2003 | Althaus et al. |
| 6,654,346 B1 | 11/2003 | Mahalingaiah et al. |
| 6,701,415 B1 | 3/2004 | Hendren, III |
| 6,708,220 B1 | 3/2004 | Olin |
| 6,728,704 B2 | 4/2004 | Mao et al. |
| 6,738,357 B1 | 5/2004 | Richter et al. |
| 6,744,776 B1 | 6/2004 | Kalkunte et al. |
| 6,754,215 B1 | 6/2004 | Arikawa et al. |
| 6,754,699 B2 | 6/2004 | Swildens et al. |
| 6,760,337 B1 | 7/2004 | Snyder, II et al. |
| 6,795,860 B1 | 9/2004 | Shah |
| 6,857,009 B1 | 2/2005 | Ferreria |
| 6,862,282 B1 | 3/2005 | Oden |
| 6,865,593 B1 | 3/2005 | Reshef et al. |
| 6,868,447 B1 | 3/2005 | Slaughter et al. |
| 6,871,221 B1 | 3/2005 | Styles |
| 6,880,017 B1 | 4/2005 | Marce et al. |
| 6,883,137 B1 | 4/2005 | Girardot et al. |
| 6,904,040 B2 | 6/2005 | Salapura et al. |
| 6,914,881 B1 | 7/2005 | Mansfield et al. |
| 6,928,518 B2 | 8/2005 | Talagala |
| 6,970,475 B1 | 11/2005 | Fraser et al. |
| 6,970,924 B1 | 11/2005 | Chu et al. |
| 6,973,490 B1 | 12/2005 | Robertson et al. |
| 6,975,592 B1 | 12/2005 | Seddigh et al. |
| 6,990,074 B2 | 1/2006 | Wan et al. |
| 6,990,114 B1 | 1/2006 | Erimli et al. |
| 7,003,564 B2 | 2/2006 | Greuel et al. |
| 7,006,502 B2 | 2/2006 | Lin |
| 7,020,713 B1 | 3/2006 | Shah et al. |
| 7,023,974 B1 | 4/2006 | Brannam et al. |
| 7,035,212 B1 | 4/2006 | Mittal et al. |
| 7,039,061 B2 | 5/2006 | Connor et al. |
| 7,065,482 B2 | 6/2006 | Shorey et al. |
| 7,075,924 B2 | 7/2006 | Richter et al. |
| 7,076,689 B2 | 7/2006 | Atkinson |
| 7,080,314 B1 | 7/2006 | Garofalakis et al. |
| 7,089,491 B2 | 8/2006 | Feinberg et al. |
| 7,113,996 B2 | 9/2006 | Kronenberg |
| 7,133,863 B2 | 11/2006 | Teng et al. |
| 7,161,904 B2 | 1/2007 | Hussain et al. |
| 7,191,163 B2 | 3/2007 | Herrera et al. |
| 7,228,359 B1 | 6/2007 | Monteiro |
| 7,236,491 B2 | 6/2007 | Tsao et al. |
| 7,240,100 B1 | 7/2007 | Wein et al. |
| 7,257,633 B2 | 8/2007 | Masputra et al. |
| 7,292,541 B1 | 11/2007 | CS |
| 7,296,263 B1 | 11/2007 | Jacob |
| 7,308,475 B1 | 12/2007 | Pruitt et al. |
| 7,324,533 B1 | 1/2008 | DeLiberato et al. |
| 7,340,571 B2 | 3/2008 | Saze |
| 7,373,438 B1 | 5/2008 | DeBergalis et al. |
| 7,409,440 B1 | 8/2008 | Jacob |
| 7,555,608 B2 | 6/2009 | Naik et al. |
| 7,577,723 B2 | 8/2009 | Matsuda et al. |
| 7,640,347 B1 | 12/2009 | Sloat et al. |
| 7,684,423 B2 | 3/2010 | Tripathi et al. |
| 7,698,458 B1 | 4/2010 | Liu et al. |
| 7,822,839 B1 | 10/2010 | Pruitt et al. |
| 7,861,085 B1 | 12/2010 | Case et al. |
| 7,895,653 B2 | 2/2011 | Calo et al. |
| 7,903,554 B1 | 3/2011 | Manur et al. |
| 7,908,245 B2 | 3/2011 | Nakano et al. |
| 7,958,222 B1 | 6/2011 | Pruitt et al. |
| 7,984,500 B1 | 7/2011 | Khanna et al. |
| 8,024,443 B1 | 9/2011 | Jacob |
| 8,037,528 B2 | 10/2011 | Williams et al. |
| 8,064,342 B2 | 11/2011 | Badger |
| 8,069,225 B2 | 11/2011 | McCanne et al. |
| 8,155,128 B2 | 4/2012 | Balyan et al. |
| 8,171,124 B2 | 5/2012 | Kondamuru |
| 8,190,769 B1 | 5/2012 | Shukla et al. |
| 8,271,620 B2 | 9/2012 | Witchey |
| 8,396,836 B1 | 3/2013 | Ferguson et al. |
| 8,463,850 B1 | 6/2013 | McCann |
| 8,484,348 B2 | 7/2013 | Subramanian et al. |
| 8,601,000 B1 | 12/2013 | Stefani et al. |
| 8,838,817 B1 | 9/2014 | Biswas |
| 8,879,431 B2 | 11/2014 | Ridel et al. |
| 8,959,215 B2 | 2/2015 | Koponen et al. |
| 9,143,451 B2 | 9/2015 | Amdahl et al. |
| 2001/0007560 A1 | 7/2001 | Masuda et al. |
| 2002/0010757 A1 | 1/2002 | Granik et al. |
| 2002/0012352 A1 | 1/2002 | Hansson et al. |
| 2002/0038360 A1 | 3/2002 | Andrews et al. |
| 2002/0065848 A1 | 5/2002 | Walker et al. |
| 2002/0072048 A1 | 6/2002 | Slattery et al. |
| 2002/0087571 A1 | 7/2002 | Stapel et al. |
| 2002/0087744 A1 | 7/2002 | Kitchin |
| 2002/0099829 A1 | 7/2002 | Richards et al. |
| 2002/0099842 A1 | 7/2002 | Jennings et al. |
| 2002/0103823 A1 | 8/2002 | Jackson et al. |
| 2002/0143819 A1 | 10/2002 | Han et al. |
| 2002/0143852 A1 | 10/2002 | Guo et al. |
| 2002/0162118 A1 | 10/2002 | Levy et al. |
| 2002/0174216 A1 | 11/2002 | Shorey et al. |
| 2002/0194112 A1 | 12/2002 | DePinto et al. |
| 2002/0194342 A1 | 12/2002 | Lu et al. |
| 2002/0198956 A1 | 12/2002 | Dunshea et al. |
| 2003/0005172 A1 | 1/2003 | Chessell |
| 2003/0009528 A1 | 1/2003 | Sharif et al. |
| 2003/0018450 A1 | 1/2003 | Carley |
| 2003/0018585 A1 | 1/2003 | Butler et al. |
| 2003/0034905 A1 | 2/2003 | Anton et al. |
| 2003/0051045 A1 | 3/2003 | Connor |
| 2003/0055723 A1 | 3/2003 | English |
| 2003/0074301 A1 | 4/2003 | Solomon |
| 2003/0105846 A1 | 6/2003 | Zhao et al. |
| 2003/0108000 A1 | 6/2003 | Chaney et al. |
| 2003/0108002 A1 | 6/2003 | Chaney et al. |
| 2003/0128708 A1 | 7/2003 | Inoue et al. |
| 2003/0130945 A1 | 7/2003 | Force |
| 2003/0139934 A1 | 7/2003 | Mandera |
| 2003/0156586 A1 | 8/2003 | Lee et al. |

(56) References Cited

U.S. PATENT DOCUMENTS

| | | |
|---|---|---|
| 2003/0179755 A1* | 9/2003 | Fraser ................... 370/395.42 |
| 2003/0189936 A1 | 10/2003 | Terrell et al. |
| 2003/0191812 A1 | 10/2003 | Agarwalla et al. |
| 2003/0195813 A1 | 10/2003 | Pallister et al. |
| 2003/0212954 A1 | 10/2003 | Kikuchi et al. |
| 2003/0220835 A1 | 11/2003 | Barnes, Jr. |
| 2003/0229665 A1 | 12/2003 | Ryman |
| 2003/0236995 A1 | 12/2003 | Fretwell, Jr. |
| 2004/0006591 A1 | 1/2004 | Matsui et al. |
| 2004/0015783 A1 | 1/2004 | Lennon et al. |
| 2004/0017825 A1 | 1/2004 | Stanwood et al. |
| 2004/0030627 A1 | 2/2004 | Sedukhin |
| 2004/0030740 A1 | 2/2004 | Stelting |
| 2004/0043758 A1 | 3/2004 | Sorvari et al. |
| 2004/0059789 A1 | 3/2004 | Shum |
| 2004/0064544 A1 | 4/2004 | Barsness et al. |
| 2004/0064554 A1 | 4/2004 | Kuno et al. |
| 2004/0093361 A1 | 5/2004 | Therrien et al. |
| 2004/0122926 A1 | 6/2004 | Moore et al. |
| 2004/0123277 A1 | 6/2004 | Schrader et al. |
| 2004/0133605 A1 | 7/2004 | Chang et al. |
| 2004/0138858 A1 | 7/2004 | Carley |
| 2004/0167967 A1 | 8/2004 | Bastian et al. |
| 2004/0177165 A1 | 9/2004 | Masputra et al. |
| 2004/0213156 A1 | 10/2004 | Smallwood et al. |
| 2004/0215665 A1 | 10/2004 | Edgar et al. |
| 2004/0236826 A1 | 11/2004 | Harville et al. |
| 2005/0008017 A1 | 1/2005 | Datta et al. |
| 2005/0021703 A1 | 1/2005 | Cherry et al. |
| 2005/0027841 A1 | 2/2005 | Rolfe |
| 2005/0044158 A1 | 2/2005 | Malik |
| 2005/0117589 A1 | 6/2005 | Douady et al. |
| 2005/0165656 A1 | 7/2005 | Frederick et al. |
| 2005/0174944 A1 | 8/2005 | Legault et al. |
| 2005/0175013 A1* | 8/2005 | Le Pennec et al. ..... 370/395.42 |
| 2005/0198234 A1 | 9/2005 | Leib et al. |
| 2005/0213587 A1 | 9/2005 | Cho et al. |
| 2005/0234928 A1 | 10/2005 | Shkvarchuk et al. |
| 2005/0240664 A1 | 10/2005 | Chen et al. |
| 2005/0256806 A1 | 11/2005 | Tien et al. |
| 2005/0273456 A1 | 12/2005 | Revanuru et al. |
| 2006/0031374 A1 | 2/2006 | Lu et al. |
| 2006/0031778 A1 | 2/2006 | Goodwin et al. |
| 2006/0045089 A1 | 3/2006 | Bacher et al. |
| 2006/0045096 A1 | 3/2006 | Farmer et al. |
| 2006/0047785 A1 | 3/2006 | Wang et al. |
| 2006/0100752 A1 | 5/2006 | Kim et al. |
| 2006/0112367 A1 | 5/2006 | Harris |
| 2006/0123210 A1 | 6/2006 | Pritchett et al. |
| 2006/0130133 A1 | 6/2006 | Andreev et al. |
| 2006/0133374 A1 | 6/2006 | Sekiguchi |
| 2006/0140193 A1 | 6/2006 | Kakani et al. |
| 2006/0153201 A1 | 7/2006 | Hepper et al. |
| 2006/0209669 A1* | 9/2006 | Nishio ........................ 370/208 |
| 2006/0229861 A1 | 10/2006 | Tatsuoka et al. |
| 2006/0235998 A1 | 10/2006 | Stechler et al. |
| 2006/0259320 A1 | 11/2006 | LaSalle et al. |
| 2006/0268692 A1 | 11/2006 | Wright et al. |
| 2006/0270341 A1 | 11/2006 | Kim et al. |
| 2006/0282442 A1 | 12/2006 | Lennon et al. |
| 2007/0005807 A1 | 1/2007 | Wong |
| 2007/0016613 A1 | 1/2007 | Foresti et al. |
| 2007/0019636 A1 | 1/2007 | Lau et al. |
| 2007/0038994 A1 | 2/2007 | Davis et al. |
| 2007/0067373 A1* | 3/2007 | Higgins et al. ............... 707/206 |
| 2007/0067771 A1 | 3/2007 | Kulbak et al. |
| 2007/0112775 A1 | 5/2007 | Ackerman |
| 2007/0124415 A1 | 5/2007 | Lev-Ran et al. |
| 2007/0124502 A1 | 5/2007 | Li |
| 2007/0130255 A1 | 6/2007 | Wolovitz et al. |
| 2007/0147246 A1 | 6/2007 | Hurley et al. |
| 2007/0162891 A1 | 7/2007 | Burner et al. |
| 2007/0168320 A1 | 7/2007 | Borthakur et al. |
| 2007/0168525 A1 | 7/2007 | DeLeon et al. |
| 2007/0192543 A1 | 8/2007 | Naik et al. |
| 2007/0233826 A1 | 10/2007 | Tindal et al. |
| 2007/0250560 A1 | 10/2007 | Wein et al. |
| 2008/0004022 A1 | 1/2008 | Johannesson et al. |
| 2008/0010372 A1 | 1/2008 | Khedouri et al. |
| 2008/0022059 A1 | 1/2008 | Zimmerer et al. |
| 2008/0120592 A1 | 5/2008 | Tanguay et al. |
| 2008/0141246 A1 | 6/2008 | Kuck et al. |
| 2008/0208917 A1 | 8/2008 | Smoot et al. |
| 2008/0263401 A1 | 10/2008 | Stenzel |
| 2008/0270578 A1 | 10/2008 | Zhang et al. |
| 2008/0281908 A1 | 11/2008 | McCanne et al. |
| 2008/0281944 A1 | 11/2008 | Vorne et al. |
| 2009/0080440 A1 | 3/2009 | Balyan et al. |
| 2009/0089487 A1 | 4/2009 | Kwon et al. |
| 2009/0094311 A1 | 4/2009 | Awadallah et al. |
| 2009/0097480 A1 | 4/2009 | Curtis et al. |
| 2009/0106413 A1 | 4/2009 | Salo et al. |
| 2009/0125955 A1 | 5/2009 | DeLorme |
| 2009/0138314 A1 | 5/2009 | Bruce |
| 2009/0161542 A1 | 6/2009 | Ho |
| 2009/0187915 A1 | 7/2009 | Chew et al. |
| 2009/0217163 A1 | 8/2009 | Jaroker |
| 2009/0217386 A1 | 8/2009 | Schneider |
| 2009/0241176 A1 | 9/2009 | Beletski et al. |
| 2009/0265396 A1 | 10/2009 | Ram et al. |
| 2009/0265467 A1 | 10/2009 | Peles |
| 2009/0289828 A1 | 11/2009 | Hinchey |
| 2009/0292957 A1 | 11/2009 | Bower et al. |
| 2009/0300161 A1 | 12/2009 | Pruitt et al. |
| 2009/0316708 A1 | 12/2009 | Yahyaoui et al. |
| 2009/0319600 A1 | 12/2009 | Sedan et al. |
| 2010/0042743 A1 | 2/2010 | Jeon et al. |
| 2010/0061232 A1 | 3/2010 | Zhou et al. |
| 2010/0064001 A1 | 3/2010 | Daily |
| 2010/0070476 A1 | 3/2010 | O'Keefe et al. |
| 2010/0093318 A1 | 4/2010 | Zhu et al. |
| 2010/0103820 A1* | 4/2010 | Fuller et al. ................... 370/236 |
| 2010/0131654 A1 | 5/2010 | Malakapalli et al. |
| 2010/0179984 A1 | 7/2010 | Sebastian |
| 2010/0228814 A1 | 9/2010 | McKenna et al. |
| 2010/0228819 A1 | 9/2010 | Wei |
| 2010/0242092 A1 | 9/2010 | Harris et al. |
| 2010/0250497 A1 | 9/2010 | Redlich et al. |
| 2010/0261479 A1* | 10/2010 | Hidaka ........................ 455/445 |
| 2010/0274772 A1 | 10/2010 | Samuels |
| 2010/0306169 A1 | 12/2010 | Pishevar et al. |
| 2011/0055921 A1 | 3/2011 | Narayanaswamy et al. |
| 2011/0066736 A1 | 3/2011 | Mitchell et al. |
| 2011/0072321 A1 | 3/2011 | Dhuse |
| 2011/0075667 A1 | 3/2011 | Li et al. |
| 2011/0078303 A1 | 3/2011 | Li et al. |
| 2011/0098087 A1* | 4/2011 | Tseng ............................ 455/557 |
| 2011/0113095 A1 | 5/2011 | Hatami-Hanza |
| 2011/0185082 A1 | 7/2011 | Thompson |
| 2011/0188415 A1 | 8/2011 | Graziano |
| 2011/0213911 A1 | 9/2011 | Eldus et al. |
| 2012/0094631 A1* | 4/2012 | Pattabiraman ................ 455/405 |
| 2012/0117028 A1 | 5/2012 | Gold et al. |
| 2012/0150805 A1 | 6/2012 | Pafumi et al. |
| 2012/0195273 A1* | 8/2012 | Iwamura et al. ............. 370/329 |
| 2012/0254293 A1 | 10/2012 | Winter et al. |
| 2012/0258766 A1* | 10/2012 | Cho et al. ..................... 455/525 |
| 2013/0058229 A1 | 3/2013 | Casado et al. |
| 2013/0114497 A1* | 5/2013 | Zhang et al. ................. 370/312 |
| 2013/0182713 A1 | 7/2013 | Giacomoni et al. |
| 2013/0238472 A1* | 9/2013 | Fan et al. ....................... 705/34 |
| 2014/0071895 A1* | 3/2014 | Bane et al. ................... 370/328 |
| 2014/0099945 A1* | 4/2014 | Singh et al. ................ 455/432.1 |
| 2014/0105069 A1* | 4/2014 | Potnuru ........................ 370/255 |
| 2014/0187199 A1* | 7/2014 | Yan et al. ..................... 455/410 |
| 2014/0286316 A1* | 9/2014 | Park et al. .................... 370/332 |
| 2015/0058595 A1 | 2/2015 | Gura et al. |

FOREIGN PATENT DOCUMENTS

| | | |
|---|---|---|
| EP | 1081918 A2 | 8/2000 |
| JP | 6205006 A3 | 7/1994 |
| JP | 821924 B2 | 3/1996 |
| JP | 2000183935 A3 | 6/2000 |

(56) References Cited

FOREIGN PATENT DOCUMENTS

| | | |
|---|---|---|
| WO | 0058870 | 3/2000 |
| WO | 0239696 A2 | 5/2002 |
| WO | 2006091040 A1 | 8/2006 |

OTHER PUBLICATIONS

Blue Coat, "Technology Primer: CIFS Protocol Optimization," Blue Coat Systems Inc., 2007, last accessed: Dec. 9, 2013, pp. 1-3, (http://www.bluecoat.com).
"Diameter MBLB Support Phase 2: Generic Message Based Load Balancing (GMBLB)", last accessed Mar. 29, 2010, pp. 1-10, (http://peterpan.f5net.com/twiki/bin/view/TMOS/TMOSDiameterMBLB).
F5 Networks Inc., "Big-IP® Reference Guide, version 4.5", F5 Networks Inc., Sep. 2002, pp. 11-1-11-32, Seattle, Washington.
F5 Networks Inc., "3-DNS® Reference Guide, version 4.5", F5 Networks Inc., Sep. 2002, pp. 2-1-2-28, 3-1-3-12, 5-1-5-24, Seattle, Washington.
F5 Networks Inc., "Using F5's-DNS Controller to Provide High Availability Between Two or More Data Centers", F5 Networks Inc., Aug. 2001, pp. 1-4, Seattle, Washington, (http://www.f5.com/f5products/3dns/relatedMaterials/3DNSRouting.html).
F5 Networks Inc., "Deploying the BIG-IP LTM for Diameter Traffic Management," F5® Deployment Guide, Publication date Sep. 2010, Version 1.2, pp. 1-19.
F5 Networks Inc., "F5 Diameter RM", Powerpoint document, Jul. 16, 2009, pp. 1-7.
F5 Networks Inc., "Routing Global Internet Users to the Appropriate Data Center and Applications Using F5's 3-DNS Controller", F5 Networks Inc., Aug. 2001, pp. 1-4, Seattle, Washington, (http://www.f5.com/f5producs/3dns/relatedMaterials/UsingF5.html).
F5 Networks Inc., "Case Information Log for 'Issues with BoNY upgrade to 4.3-'", as early as Feb. 2008.
F5 Networks Inc., "F5 WANJet CIFS Acceleration", White Paper, F5 Networks Inc., Mar. 2006, pp. 1-5, Seattle, Washington.
Fajardo V., "Open Diameter Software Architecture," Jun. 25, 2004, pp. 1-6, Version 1.0.7.
Gupta et al., "Algorithms for Packet Classification", Computer Systems Laboratory, Stanford University, CA, Mar./Apr. 2001, pp. 1-29.
Heinz G., "Priorities in Stream Transmission Control Protocol (SCTP) Multistreaming", Thesis submitted to the Faculty of the University of Delaware, Spring 2003, pp. 1-35.
Ilvesjmaki M., et al., "On the capabilities of application level traffic measurements to differentiate and classify Internet traffic", Presented in SPIE's International Symposium ITcom, Aug. 19-21, 2001, pp. 1-11, Denver, Colorado.
Internet Protocol,"DARPA Internet Program Protocol Specification", (RFC:791), Information Sciences Institute, University of Southern California, Sep. 1981, pp. 1-49.
Kawamoto, D., "Amazon files for Web services patent", CNET News.com, Jul. 28, 2005, pp. 1-2, (http://news.com).
LaMonica M., "Infravio spiffs up Web services registry idea", CNET News.com, May 11, 2004, pp. 1-2, (http://www.news.com).
MacVittie, Lori, "Message-Based Load Balancing," Technical Brief, Jan. 2010, pp. 1-9, F5 Networks, Inc.
"Market Research & Releases, CMPP PoC documentation", last accessed Mar. 29, 2010, (http://mainstreet/sites/PD/Teams/ProdMgmt/MarketResearch/Universal).
"Market Research & Releases, Solstice Diameter Requirements", last accessed Mar. 29, 2010, (http://mainstreet/sites/PD/Teams/ProdMgmt/MarketResearch/Unisversal).

Modiano E., "Scheduling Algorithms for Message Transmission Over a Satellite Broadcast System," MIT Lincoln Laboratory Advanced Network Group, Nov. 1997, pp. 1-7.
Nichols K., et al., "Definition of the Differentiated Services Field (DS Field) in the IPv4 and IPv6 Headers", (RFC:2474) Network Working Group, Dec. 1998, pp. 1-19, (http://www.ietf.org/rfc/rfc2474.txt).
Ott D., et al., "A Mechanism for TCP-Friendly Transport-level Protocol Coordination", USENIX Annual Technical Conference, Jun. 10, 2002, University of North Carolina at Chapel Hill, pp. 1-12.
Padmanabhan V., et al., "Using Predictive Prefetching to Improve World Wide Web Latency", SIGCOM, Jul. 1, 1996, pp. 1-15.
"Respond to server depending on TCP::client_port", DevCentral Forums iRules, pp. 1-6, last accessed Mar. 26, 2010, (http://devcentral.f5.com/Default/aspx?tabid=53&forumid=5&tpage=1&v).
Rosen E, et al., "MPLS Label Stack Encoding", (RFC:3032) Network Working Group, Jan. 2001, pp. 1-22, (http://www.ietf.org/rfc/rfc3032.txt).
Schilit B., "Bootstrapping Location-Enhanced Web Services", University of Washington, Dec. 4, 2003, (http://www.cs.washington.edu/news/colloq.info.html).
Seeley R., "Can Infravio technology revive UDDI?", ADTmag.com, Oct. 22, 2003, (http://www.adtmag.com).
Shohoud, Y., "Building XML Web Services with vb .net and VB 6'", Addison Wesley, Sep. 2002, pp. 1-14.
Sommers F., "Whats New in UDDI 3.0—Part 1", Web Services Papers, Jan. 27, 2003, pp. 1-4, (http://www.webservices.org/index.php/article/articleprint/871/-1/24/).
Sommers F., "Whats New in UDDI 3.0—Part 2", Web Services Papers, Mar. 2, 2003, pp. 1-8, (http://www.web.archive.org/web/20040620131006/).
Sommers F., "Whats New in UDDI 3.0—Part 3", Web Services Papers, Sep. 2, 2003, pp. 1-4, (http://www.webservices.org/index.php/article/articleprint/894/-1/24/).
Sleeper B., "The Evolution of UDDI", UDDI.org White Paper, The Stencil Group, Inc., Jul. 19, 2002, pp. 1-15, San Francisco, California.
Sleeper B., "Why UDDI Will Succeed, Quietly: Two Factors Push Web Services Forward", The Stencil Group, Inc., Apr. 2001, pp. 1-7, San Francisco, California.
"UDDI Overview", Sep. 6, 2000, pp. 1-21, uddi.org, (http://www.uddi.org/).
"UDDI Version 3.0.1", UDDI Spec Technical Committee Specification, Oct. 14, 2003, pp. 1-383, uddi.org, (http://www.uddi.org/).
"UDDI Technical White Paper," Sep. 6, 2000, pp. 1-12, uddi-org, (http://www.uddi.org/).
U.S. Appl. No. 13/771,538 to Michels et al., filed Feb. 20, 2013.
U.S. Appl. No. 14/032,329 to Masters et al., filed Sep. 20, 2013.
U.S. Appl. No. 14/038,433 to Amdahl, filed Sep. 26, 2013.
U.S. Appl. No. 14/042,237 to Amdahl, filed Sep. 30, 2013.
U.S. Appl. No. 14/081,700 to McCann filed Nov. 15, 2013.
U.S. Appl. No. 14/139,228 to Lewites et al., filed Dec. 23, 2014.
U.S. Appl. No. 14/144,137 to Amdahl, filed Dec. 30, 2013.
Wang B., "Priority and realtime data transfer over the best-effort Internet", Dissertation Abstract, ScholarWorks@UMASS, Sep. 2005, pp. i-xiv and pp. 1-9.
Wikipedia, "Diameter (protocol)", pp. 1-11, last accessed Oct. 27, 2010, (http://en.wikipedia.org/wiki/Diameter_(protocol)).
Woo T.Y.C., "A Modular Approach to Packet Classification: Algorithms and Results", Nineteenth Annual Conference of the IEEE Computer and Communications Societies 3(3):1213-22, Mar. 26-30, 2000, abstract only, (http://ieeexplore.ieee.org/xpl/freeabs_all.jsp?arnumber=832499).

* cited by examiner

NATIONAL TRAFFIC STEERING DEVICE FOR A BETTER CONTROL OF A SPECIFIC WIRELESS/LTE NETWORK

This application claims the benefit of U.S. Provisional Patent Application Ser. No. 61/770,473 filed on Feb. 28, 2013, which is hereby incorporated by reference in its entirety.

FIELD

This technology relates generally to national connection steering of mobile device subscribers to a preferred Mobile network to reduce costs of roaming. More particularly, this technology relates to a national controlling and steering device for maintaining a mobile device of a subscriber connected to a specific network.

SUMMARY

This technology provides a controlling and steering device for maintaining national connection between a mobile device of a subscriber and a mobile network. An example of the system comprises: a steering logic module configured to determine when a national connection between a mobile device of a subscriber via a Mobility Management Entity (MME) and a mobile network via a Home Subscriber Server (HSS) is permitted; a communication module is arranged to send and receive messages from HSS to MME and from MME to HSS; and a tracing module configured to periodically sample a mobile device of a subscriber or a location of the mobile device and to check amount of data sent and received from the mobile device is below a specified threshold. The redirection of mobile device is enabled in case the amount of data sent and received from the mobile device exceeds a predefined maximum threshold or precedes a predefined minimum threshold, by initiating a cancel Packet Data Protocol (PDP) procedure to move the terminal into an idle mode and scanning for available mobile networks.

According to some examples of this technology the redirection is enabled after verifying the device home network coverage, capacity and availability in a specific location and time.

According to some examples of this technology the coverage, capacity and availability are examined in relation to one or more predefined parameters including at least one of: type of usage, type of service, or amount of data already exchanged for that service.

According to some examples of this technology the periodic sampling is achieved by at least one of the following methods: using a timer, monitoring behavior of the terminal via signaling messages, or by receiving input from external monitoring system.

According to some examples of this technology in case Home Public Land Mobile (HPLM) network appears in the list of mobile networks that were scanned then HPLM network is being selected.

According to some examples of this technology in case a HPLM network is not in the list of mobile networks that were scanned by the terminal, the terminal selects an already Visited Public Land Mobile (VPLM) network.

According to some examples of this technology the steering logic module enables to send a response to the MME in case HPLM network was selected or an already VPLM network was selected.

According to some examples of this technology in case the terminal initiated an update location with a different VPLM that is a preferred one, an answer is forwarded to the HSS and the HSS replies with an acknowledgment Update Location Answer (ULA).

According to some examples of this technology in case the terminal initiated an update location with a different VPLM that is a non-preferred one the steering device will not relay the message to the MME and initiate a countdown procedure to the number of location requests, wherein upon reaching predefined number of location request the PLMN ID is checked, if the value of the PLMN ID is the same value as it was in the previous four times, the ULA will be forwarded to the MME and the update location procedure is enabled, otherwise the countdown procedure is activated for at least a second time.

According to some examples of this technology after applying the countdown procedure for predefined number of times and PLMN ID is not matching any previous connection requests attempts, then a location update request is not forwarded to MME and a ULA message will be generated.

According to some examples of this technology tracing module apply the sampling of the mobile device and check amount of data sent and received from the mobile device only when the device current location appears in the database of available locations of the steering logic module.

This technology provides a method for maintaining national connection between a mobile device of a subscriber and a mobile network, using a steering device. The method comprising: determining when a connection between a mobile device of a subscriber via a Mobility Management Entity (MME) and a mobile network via a Home Subscriber Server (HSS) is permitted, sending and receiving messages from HSS to MME and from MME to HSS and periodically sampling a mobile device of a subscriber or a location of the mobile device and to check amount of data sent and received from the mobile device is below a specified threshold.

The redirection of mobile device is enabled in case the amount of data sent and received from the mobile device exceeds a predefined maximum threshold or precede a predefined minimum threshold, by initiating a cancel Packet Data Protocol (PDP) procedure to move the terminal into an idle mode and scanning for available mobile networks.

These, additional, and/or other aspects and/or advantages of this technology are set forth in examples in the detailed description which follows; possibly inferable from the detailed description; and/or learnable by practice of this technology.

BRIEF DESCRIPTION OF THE DRAWINGS

This technology will be more readily understood from the detailed description of examples thereof made in conjunction with the accompanying drawings of which.

DETAILED DESCRIPTION

Figure 1:
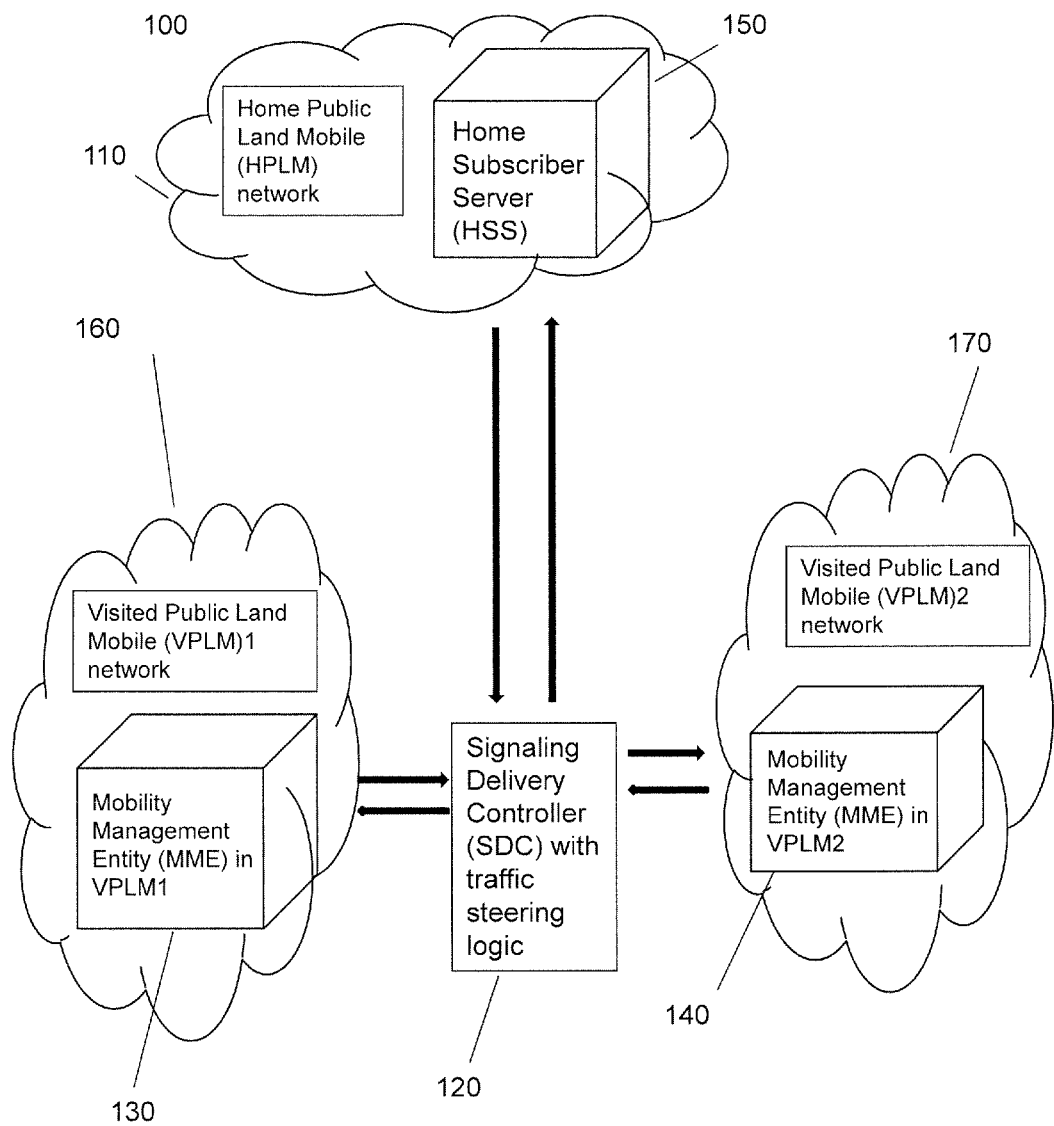
FIG. 1 is a block diagram of a controlling and steering device connected to mobile networks, according to some examples of this technology.

Before explaining at least one example of this technology in detail, it is to be understood that this technology is not limited in its application to the details of construction and the arrangement of the components set forth in the following description or illustrated in the drawings. This technology is applicable to other examples or of being practiced or carried out in various ways. Also, it is to be understood that the phraseology and terminology employed herein is for the purpose of description and should not be regarded as limiting.

The term "roaming" as used herein in this application, is defined as an extension of connectivity service for mobile devices in a different mobile network than the home network where the mobile device subscriber is registered to.

The term "idle mode" as used herein in this application, is defined as a mode of a mobile device that does not have a dedicated channel to the mobile network, but it may be reached or access to the mobile network.

For business purposes, a specific provider of mobile network services may wish to maintain its mobile device subscribers connected to a predefined mobile network for specific services. When a mobile device subscriber is roaming i.e. connected to a Visited Public Land Mobile (VPLM) network, the VPLM network provider may charge premium charges from the provider of mobile network that the mobile device subscriber is registered to. Therefore, the provider of mobile network that the mobile device subscriber is registered to may wish to avoid these charges by maintaining the mobile device subscriber connected to its mobile network, as much as possible.

The provider of mobile network services may be any provider. For the reference of this patent application the provider of mobile connection services may be a public safety network provider. Public safety activity involves in preventing and protecting the general public from events that may endanger its safety.

Examples of this technology provide a controlling and steering device for maintaining national connection between a mobile device of a subscriber and a mobile network.

FIG. 1 is a block diagram of a controlling and steering device 120 connected to one of the mobile networks 110, 160 and 170, according to some examples of this technology.

According to an aspect of this technology, a mobile device may be connected to a Visited Public Land Mobile (VPLM) 170. In existing System Architecture Evolution (SAE) each mobile device may be registered to a list of different Tracking Areas (TA) and may move within the areas that are in the list without performing TA update i.e. location update. However, once a mobile device has moved to an area that is not in the list of TA, for example to an area that is covered by mobile network 160, i.e. VPLM1, the mobile device performs a TA update procedure to the network, i.e. VPLM1. The TA update procedure starts with the mobile device sending a TA update message to Mobility Management Entity (MME) 130 in VPLM1 network 160. Upon reception of the TA update message, the MME 130 checks if a context for the sending mobile device is available. If it is not available the MME 130 asks the old MME 140 in VPLM 170 to send it the context of the sending mobile device. Once the MME 130 has received the context of the sending mobile device, it informs the Home Subscriber Server (HSS) for example, via means of diameter signaling that the context of the sending mobile device has moved to a new MME. As a response, the HSS cancels the context of the mobile device in the old MME 140 and then sending the response to the new MME 130 with the context of the mobile device for updating the MME 130.

A controlling and steering device 120 (also referred to as a Signaling Delivery Controller (SDC) with data steering logic) may be positioned to control and steer connection between a mobile device of a subscriber via MME in a VPLM network and HSS 150 in Home Public Land Mobile network (HPLM) 110. Accordingly, the controlling and steering device 120 controls the communication between HSS and MME, by allowing or not allowing communication between a MME and HSS. Hence, controlling which VPLM network may be used by the subscriber mobile device.

Figure 2:
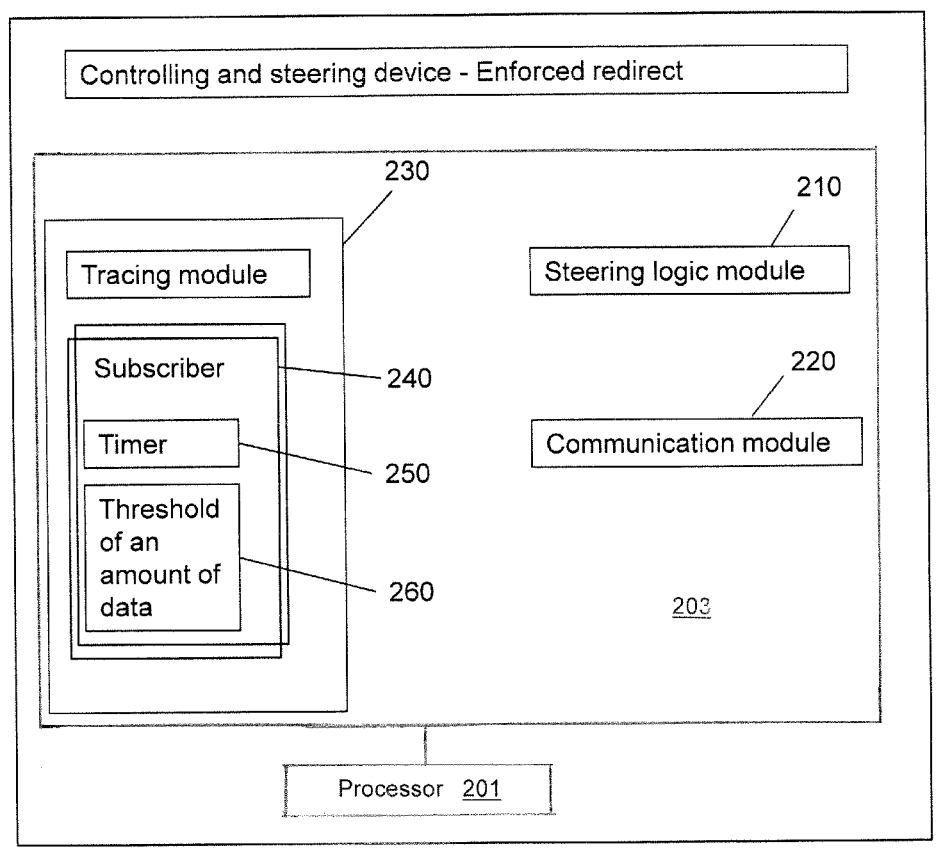
FIG. 2 is a block diagram of a controlling and steering device performing enforced redirect of connection, according to some examples of this technology.

FIG. 2 is a block diagram of a controlling and steering device 200 that is performing an enforced redirect of a connection, according to some examples for the controlling and steering device 120 of this technology.

According to an aspect of this technology, the controlling and steering device 200 includes at least one processor 201 and a memory 203 which are coupled together by one or more buses or other links, although the controlling and steering device 200 may include other types and numbers of systems, devices, components and/or other elements in other configurations.

The processor 201 of the controlling and steering device 200 may execute one or more programmed instructions stored in the memory 201 for maintaining a mobile device of a subscriber connected to a specific network as illustrated and described in the examples herein, although other types and numbers of functions and/or other operation can be performed. The processor 201 may include one or more central processing units and/or general purpose processors with one or more processing cores, for example.

The memory 203 of the controlling and steering device 200 stores the programmed instructions for one or more aspects of the present technology as described and illustrated herein, although some or all of the programmed instructions could be stored and executed elsewhere. In this example, the memory 203 includes a steering logic module 210, a communication module 220, and a tracing module 230 with a subscriber 240 having a timer 250 and thresholds of an amount of data 260, although other types and numbers of other programmed instructions, modules and/or other data could be stored. A variety of different types of memory storage devices, such as a random access memory (RAM) or a read only memory (ROM) in the system or a floppy disk, hard disk, CD ROM, DVD ROM, or other non-transitory computer readable medium which is read from and written to by a magnetic, optical, or other reading and writing system that is coupled to the processor 201, can be used for the memory 203.

The tracing module 230 may be configured to: (i) periodically sample a mobile device of a subscriber or a location of the mobile device or receive an input from external monitoring system (e.g. charging system); and (ii) check the type and/or the amount of data sent and received from the mobile device is within predefined threshold values. According to some examples checking if the amount of data is below a specified threshold to identify idle time when the user is not using the mobile device. According to some examples checking if the amount of data is above a specified threshold to identify when the user is using the mobile device for long periods at high usage rates when not using the home network. In order to periodically sample the mobile device of a selected subscriber or a selected group of subscribers, each subscriber is assigned a timer 250. When the timer 250 expires for the subscriber the type and/or the amount of data that is exchanged from the subscriber's mobile device is checked. If the amount of data is below or above a specified threshold 260, meaning that the subscriber is not in the middle of a conversation or having long expensive conversation, then the controlling and steering device 200 initiates a Packet Data Protocol (PDP) cancel procedure to move the mobile device into an idle mode.

According to another aspect of this technology, after the mobile device is scanning for available mobile network and selecting a mobile network the controlling and steering device 200 by operating a steering logic module 210 is configured to determine if a national connection between the mobile device of a subscriber via a MME (not shown) and a mobile network via a Home Subscriber Server (HSS) is allowed. Steering logic module 210 may also communicate with external node 230 holding external steering rules and data.

According to yet another aspect of this technology, the controlling and steering device 200 by operating a communication module 220 is arranged to send and receive messages from HSS to MME and from MME to HSS.

Figure 3A:
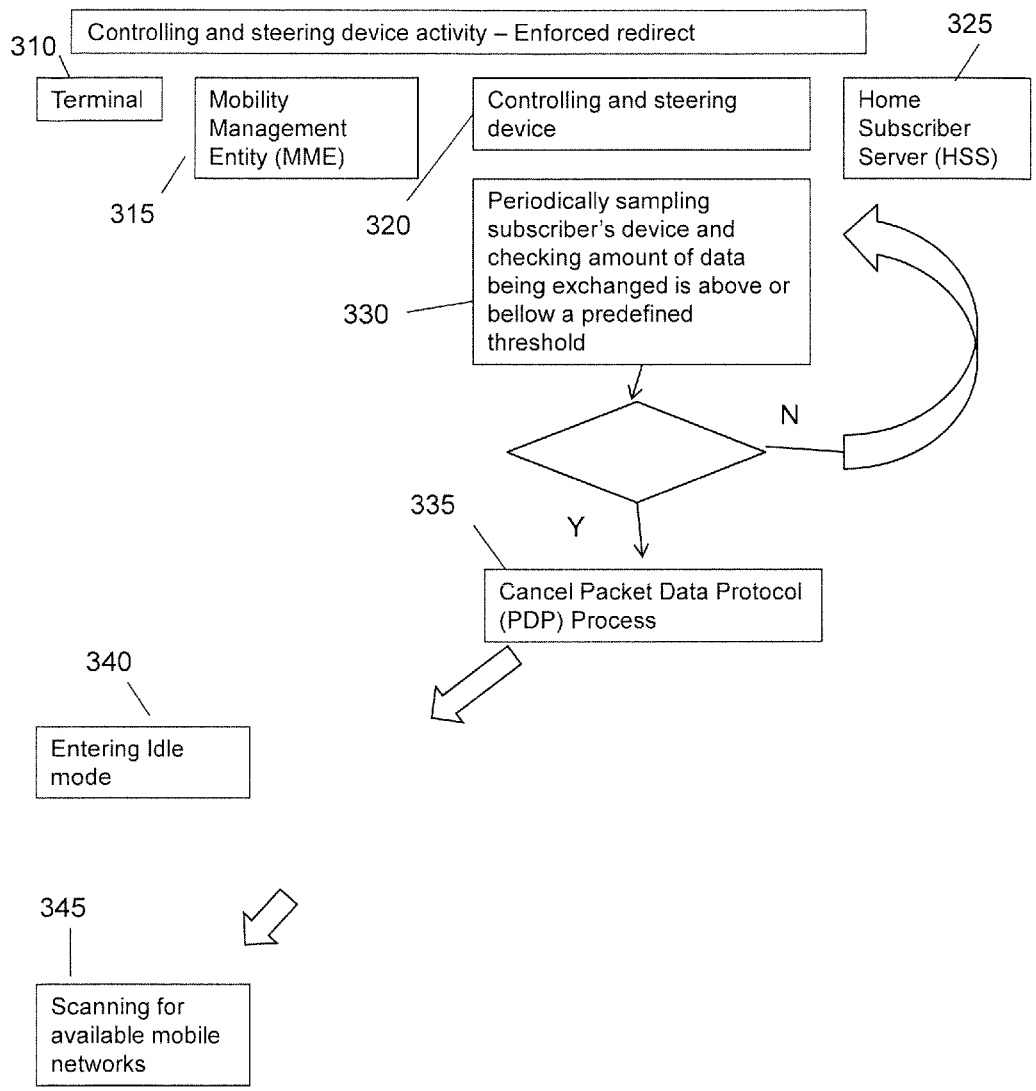
FIG. 3A is a flow diagram of a first step of a controlling and steering device performing enforced redirect of connection, according to some examples of this technology.

FIG. 3A is a flow diagram of first step of a controlling and steering device 320 performing enforced redirect of connection, according to some examples of this technology. According to an aspect of this technology, a mobile device i.e. terminal 310 may be periodically sampled by a controlling and steering device 320. The controlling and steering device 320 may operate a tracing module (not shown) to perform periodic samples of the terminal 310 by assigning a timer to it. Or alternatively its behavior is monitored via signaling messages. When the timer that was assigned is expired, the tracing module 230 checks if an amount of data that is being exchanged is below or above a predefined threshold (stage 330). If the amount of data, absolute amount or a specific type of data (meaning, related to a specific service usage) is not below or above the predefined threshold, meaning the terminal 310 is in use the tracing module 230 keeps checking the amount of data that is being exchange.

According to an aspect of this technology, if the amount of data that is being exchanged is below or above a predefined threshold, in other words, the terminal for example is not in the middle of a conversation or having long expensive one, or based on other parameters (such as duration of session) the controlling and steering device 320 may initiate a cancel Packet Data Protocol (PDP) procedure (stage 335) to move the terminal 310 into an idle mode (stage 340). Or based on other decision parameters that enforce active communication to be interrupted. Then, the terminal 310 may scan for available mobile networks.

Figure 3B:
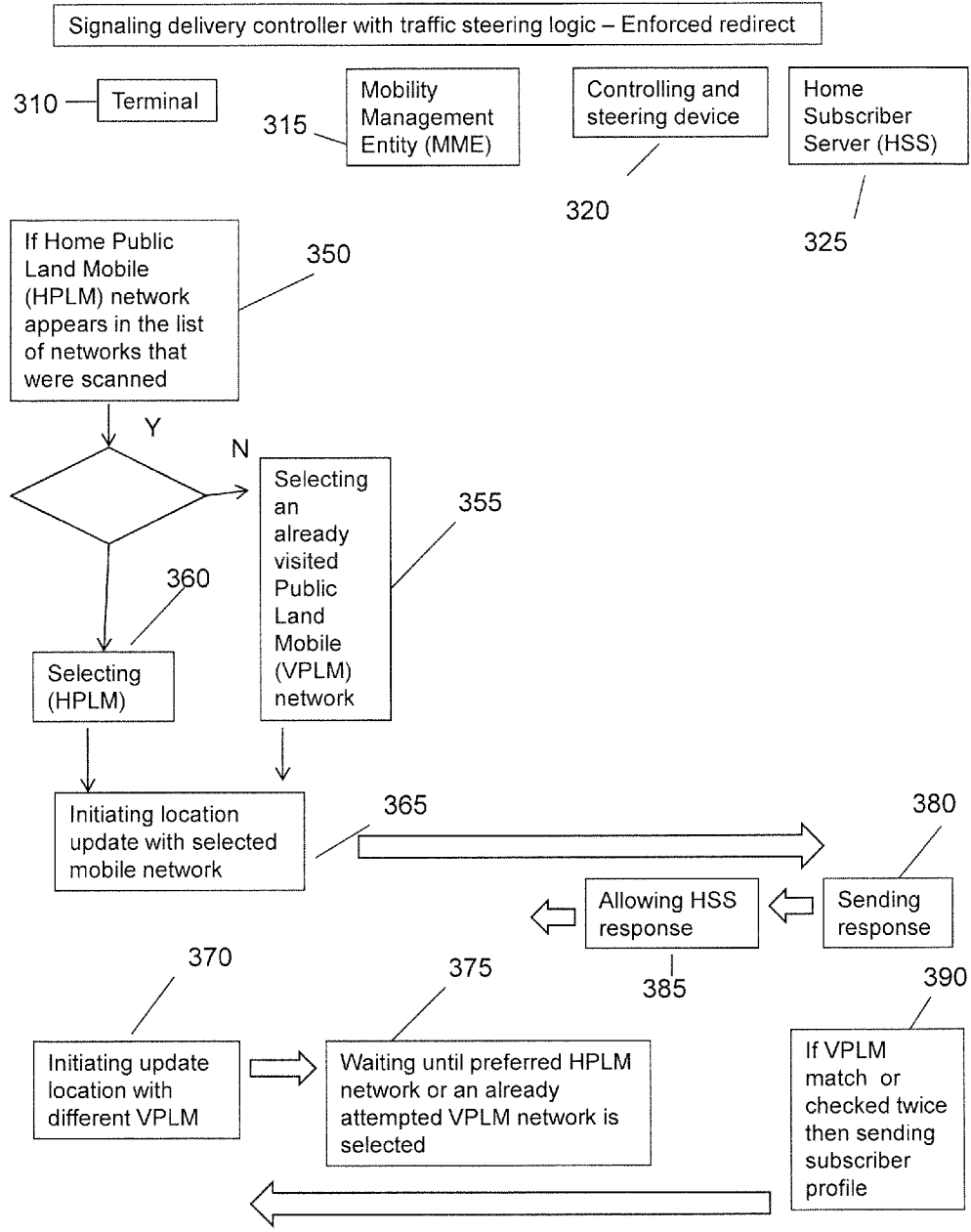
FIG. 3B is a flow diagram of a second step of a controlling and steering device performing enforced redirect of connection, according to some examples of this technology.

FIG. 3B is a flow diagram of second step of the controlling and steering device 200 performing enforced redirect of connection, according to some other examples of this technology.

According to an aspect of this technology, if Home Public Land Mobile (HPLM) network appears in the list of mobile networks that were scanned (stage 350) then HPLM network is being selected (stage 360). If HPLM network is not in the list of mobile networks that were scanned by the terminal 310, the terminal 310 may select an already Visited Public Land Mobile (VPLM) network (stage 355).

According to another aspect of this technology, after selecting a mobile network (stage 355 or stage 360) the terminal 310 may initiate location update with the selected mobile network (stage 365).

According to another aspect of this technology, the HSS may send a response 380 to MME and the controlling and steering device 320 may operate steering logic module to determine if the response may be sent to the MME. The controlling and steering device 320 may allow the response to be sent to the MME (stage 385) in case HPLM network was selected or an already VPLM network was selected.

According to yet another aspect of this technology, in case the terminal initiated an update location with a different VPLM (stage 370) and in case a VPLM that is a preferred one is selected, the answer is forwarded to the HSS and the HSS replies with an acknowledgment Update Location Answer (ULA). However, if the controlling and steering device 320 decides that this network is not preferred it will not relay the message to the MME and count the number of update location requests. Once four consecutive update location requests have been received (typically with 15 seconds apart) the Public Land Mobile Network (PLMN) ID will be stored in an onboard database with dynamic filled memory of latest PLMN IDs that have been tried for that IMSI.

According to some examples of this technology, upon receiving the fifth update location request the following scenarios may occur: (i) if the value of the PLMN ID is the same value as it was in the previous four times, the ULA will be forwarded to the MME and the update location procedure is enabled as this redirection; (ii) if the value of the PLMN ID is a different value than it was in the previous four times and not equal to an entry that was previously stored in the database but still a non-preferred VPLM value, then another sequence of four consecutive update location request is activated and the first scenario which is described above applies. PLMN ID is stored in the database for later reference. (iii) if the value of the PLMN id is the same value as before (meaning, the four consecutive times) after a sequence of five times where the value of PLMN ID was the same or the PLMN is matching an entry in the stored list of already seen VPMN ids and the message will be relayed successfully to the MME.

According to some examples of this technology, when the value of PLMN ID has changed and none of the above scenarios occur then a location update request is not forwarded to MME and a ULA message will be generated with a configurable reason why the location update request was refused.

Figure 4:
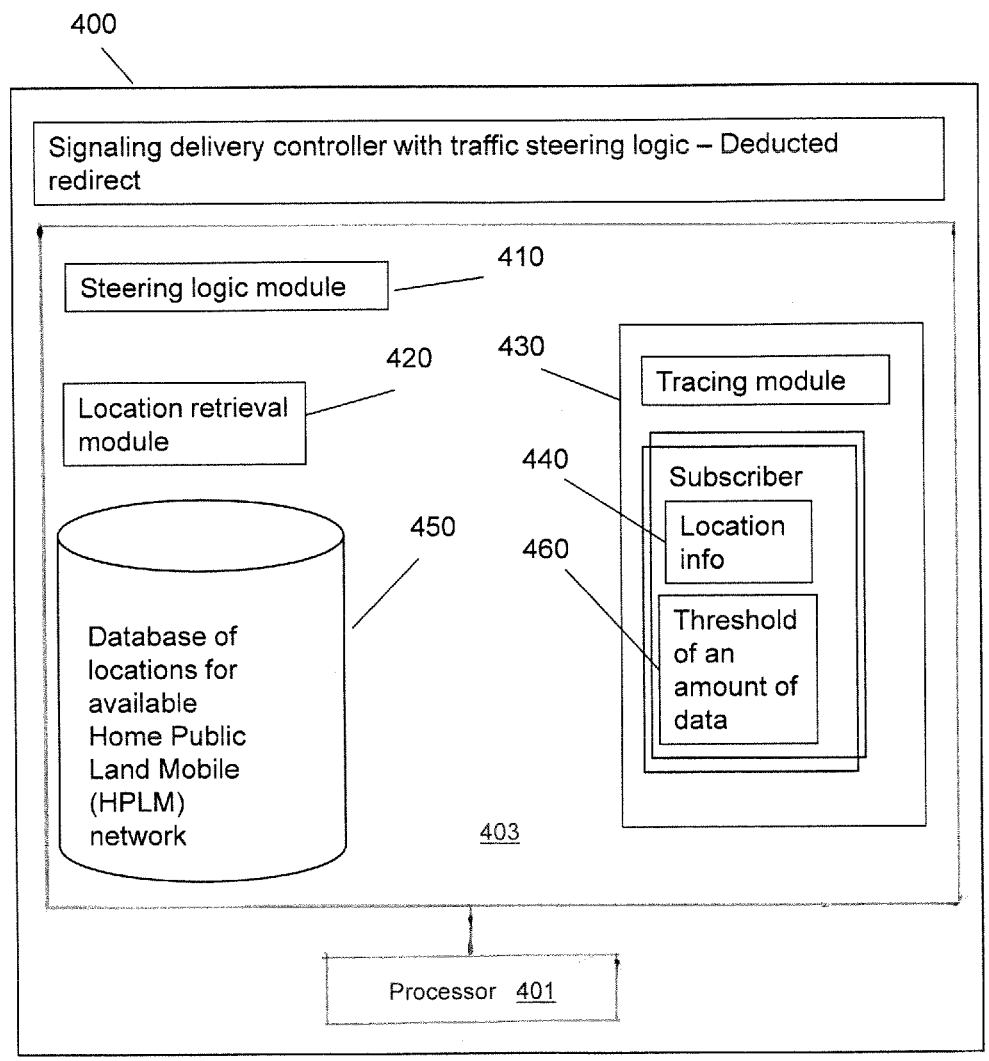
FIG. 4 is a block diagram of a controlling and steering device performing deducted redirect of connection, according to some examples of this technology.

FIG. 4 is a block diagram of a controlling and steering device 400 performing a deducted redirect of connection, according to some other examples for the controlling and steering device 120 of this technology. In these examples, the controlling and steering device 400 has the same structure and operation as the controlling and steering device 200 except as illustrated and described with the examples herein. Elements in controlling and steering device 400 which are like those in controlling and steering device 200 will have like reference numerals.

According to another aspect of this technology, the controlling and steering device 400 includes at least one processor 401 and a memory 403 which are coupled together by one or more buses or other links, although the controlling and steering device 400 may include other types and numbers of systems, devices, components and/or other elements in other configurations.

The processor 401 of the controlling and steering device 400 may execute one or more programmed instructions stored in the memory 401 for performing a deducted redirect of connection as illustrated and described in the examples herein, although other types and numbers of functions and/or other operation can be performed. The processor 401 may include one or more central processing units and/or general purpose processors with one or more processing cores, for example.

The memory 403 of the controlling and steering device 400 stores the programmed instructions for one or more aspects of the present technology as described and illustrated herein, although some or all of the programmed instructions could be stored and executed elsewhere. In this example, the memory 403 includes a steering logic module 410, a location retrieval module 420, a tracing module 430 with location information 440 and thresholds of an amount of data 460, and a database of locations for available Home Public land Mobile (HPLM) network 450, although other types and numbers of other programmed instructions, modules and/or other data could be stored. A variety of different types of memory storage devices, such as a random access memory (RAM) or a read only memory (ROM) in the system or a floppy disk, hard disk, CD ROM, DVD ROM, or other non-transitory computer readable medium which is read from and written to by a magnetic, optical, or other reading and writing system that is coupled to the processor 401, can be used for the memory 403.

According to an aspect of this technology, a selected user or a selected group of users are enforced to connect with a specified home network only after analyzing and verifying by the controlling and steering device the home network coverage, capacity and availability in a specific location, time in relation to one or more predefined parameters, such as type of usage, type of service or amount of data already exchanged for that service. The one or more predefined parameters may be activation of an event, for example natural disaster and the like.

A priority list communication is allowed in general or for a specific service or amount of data, meaning, there may be rules only for video or other specific service which allows an unlimited use of data for a specific user. When the user is using another service, the amount of data can be limited and/or forced to be steered away to another network.

As discussed above, according to an aspect of this technology, the controlling and steering device 400 may include: (i) a tracing module 430; and (ii) a steering logic module 410. Mobile network location information may be provided by the mobile network signaling, an external monitoring system or via other sources such as Global Positioning System (GPS). This information may be configured as push/pull with specified frequencies. How the network gets information on the location may not be limited. It may for example be via: (i) network signaling; (ii) monitoring signaling; and/or (iii) alternative sources like a GPS system which either via a central server or via an application on the terminal shares its location information.

According to another aspect of this technology, information regarding location in which a successful usage of HPLM network is performed is saved periodically in a database 450. The database 450 may be located in the controlling and steering device 400, but may for example be located in one or more external devices or other storage systems in communication with the controlling and steering device 400.

According to yet another aspect of this technology, the controlling and steering device 400 may operate a steering and logic module 410 to determine if a selected user that was traced by the tracing module 430 as exchanging data below or above a threshold 460 or other policies apply and is using a mobile network in a specific location 440 should be enforced to connect via HPLM network.

Figure 5A:
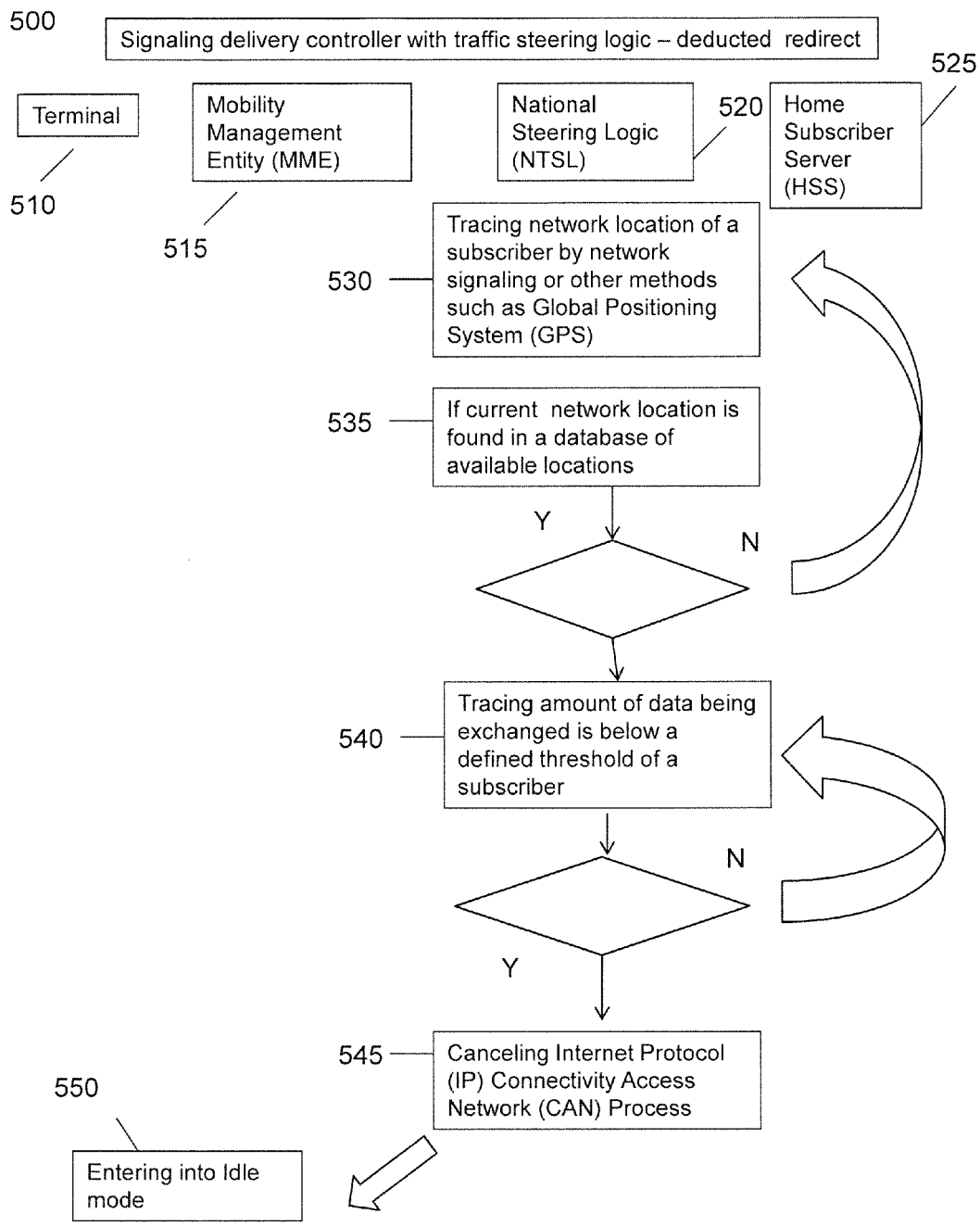
FIG. 5A is a flow diagram of an activity of a controlling and steering device that is performing deducted redirect of connection, according to some examples of this technology.

According to yet another aspect of this technology, the steering and logic module 410 may operate a location retrieval module 420 to check if the specific location 440 exists in the database of available HPLM 450. If the FIG. 5A is a flow diagram of an activity of the controlling and steering device 400 that is performing a deducted redirect of a connection, according to some examples of this technology. The National Steering Logic (NTSL) device 520 may trace the location of the subscriber and check a database of available location, if current location is stored as a location where there is a successful usage of HPLM. In case there is a successful usage of HPLM in the location, the NTSL checks if the subscriber's activity is low or high. 'Low' or high activity may be defined by the policies of the operator and can be different for different type of usage or devices. In case the activity is low or high, the NTSL may cancel the Internet Protocol (IP) Connectivity Access Network (CAN) session which is PDP session equivalent in LTE and the subscriber may enter into idle mode.

According to an aspect of this technology, NTSL device 520 may trace the location of a subscriber by network signaling or other methods such as Global Positioning Systems (GPS) (stage 530). If current network location of the subscriber is found in a database of available locations (stage 535), meaning locations that successful usage of the HPLM is possible for the current time, then in case the subscriber is exchanging amount of data below or above a defined threshold (stage 540) meaning the subscriber is in minimum activity or having long conversation, then PDP session will be cancelled (stage 545) and the terminal may enter into idle mode (stage 550).

Figure 5B:
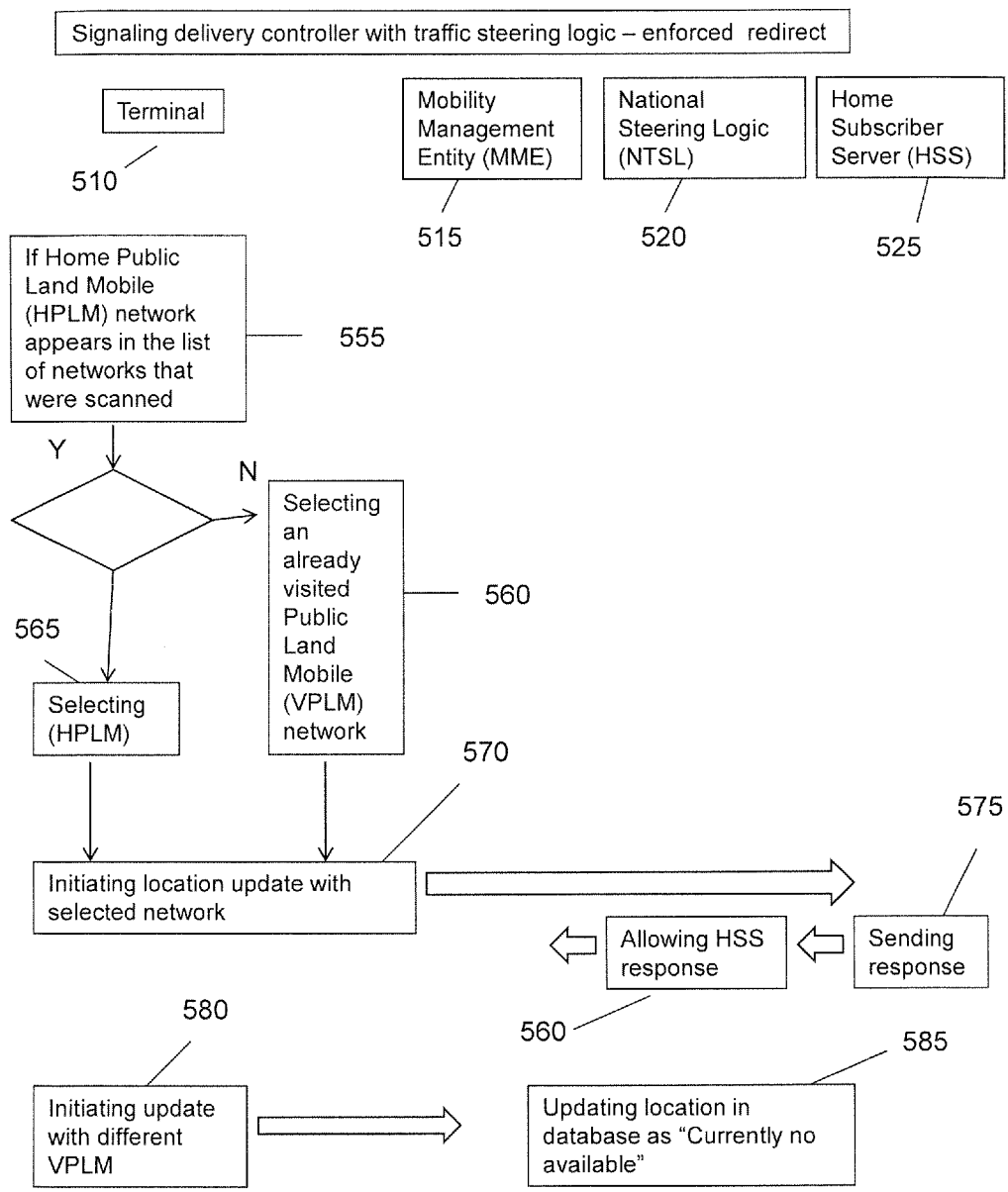
FIG. 5B is a flow diagram of an activity of a controlling and steering device that is performing enforced redirect of connection, according to some examples of this technology.

FIG. 5B is a flow diagram of an activity of a controlling and steering device 400 that is performing an enforced redirect of a connection, according to some examples of this technology. In enforced redirect, actively terminals are forced back to the HPLM when there is coverage and/or capacity available.

According to an aspect of this technology, the subscriber's device (i.e. terminal) may scan for available networks. In case, HPLM network appears in the list of found networks as a result of the scan (stage 555), the HPLM may be selected (stage 565), otherwise a network that is an already VPLM is selected (stage 560). After a network is selected for the subscriber a location update is being initiated with the selected network and sent to HSS 525 (stage 570). The HSS 525 may send a response (stage 575) via NTLS and the NTLS may allow the response to be sent to the terminal 510 (stage 560).

According to another aspect of this technology, if the network identity is different than the HPLM or an already visited VPLM, then the VPLM will initiate the default traffic steering mode and wait until either the preferred HPLM or an already attempted VPLM is received.

According to another aspect of this technology, if the same network identity is received as previously logged on to the location update procedure will be allowed without interference (stage 580). Optionally, the NTSL 520 may modify the threshold of minimum or maximum activity for the subscriber.

In the above description, an example is an example or implementation of this technology. The various appearances of "one example", "an example" or "some examples" do not necessarily all refer to the same examples.

Although various features of this technology may be described in the context of a single example, the features may also be provided separately or in any suitable combination. Conversely, although this technology may be described herein in the context of separate examples for clarity, this technology may also be implemented in a single example.

Furthermore, it is to be understood that this technology can be carried out or practiced in various ways and that this technology can be implemented in examples other than the ones outlined in the description above.

This technology is not limited to those diagrams or to the corresponding descriptions. For example, flow need not move through each illustrated box or state, or in exactly the same order as illustrated and described.

Meanings of technical and scientific terms used herein are to be commonly understood as by one of ordinary skill in the art to which this technology belongs, unless otherwise defined.

Additionally, two or more computing systems or devices can be substituted for any one of the systems or devices in any example. Accordingly, principles and advantages of distributed processing, such as redundancy and replication also can be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic media, wireless traffic networks, cellular traffic networks, G3 traffic networks, Public Switched Telephone Network (PSTNs), Packet Data Networks (PDNs), the Internet, intranets, and combinations thereof.

This technology also may be embodied as a non-transitory computer readable medium having instructions stored thereon for one or more aspects of the present technology as described and illustrated by way of the examples herein, which when executed by the processor, cause the processor to carry out the steps necessary to implement the methods of this technology as described and illustrated with the examples herein.

Having thus described the basic concept of the technology, it will be rather apparent to those skilled in the art that the foregoing detailed disclosure is intended to be presented by way of example only, and is not limiting. Various alterations, improvements, and modifications will occur and are intended to those skilled in the art, though not expressly stated herein. These alterations, improvements, and modifications are intended to be suggested hereby, and are within the spirit and scope of the technology. Additionally, the recited order of processing elements or sequences, or the use of numbers, letters, or other designations therefore, is not intended to limit the claimed processes to any order except as may be specified in the claims. Accordingly, the technology is limited only by the following claims and equivalents thereto.

What is claimed is:

1. One or more traffic management computing devices comprising:

memory comprising programmed instructions stored in the memory;

one or more processors configured to be capable of executing the programmed instructions stored in the memory to:

determine an amount of data during a session comprising the data communicated between a terminal device and at least one of a plurality of network computing devices; and cancel the session comprising the data communicated between the terminal device and at least one of the plurality of network computing devices when the determined amount of the data communicated between the terminal device and at least one of the plurality of network computing devices during the session exceeds a predefined maximum threshold or is less than a predefined minimum threshold, wherein the terminal device is in an idle mode after the session is cancelled; and scan a network to which the data communicated between the terminal device and at least one of the plurality of network computing devices will be redirected when the terminal device is in the idle mode.

2. The device of claim 1, wherein the processor is further configured to be capable of executing programmed instructions stored in the memory to:

verify home network coverage, network capacity, and network availability in a specific location and time, wherein the redirection of the data communicated between the terminal device and at least one of the plurality of network computing devices is performed after the verifying.

3. The device of claim 2, wherein the processor is further configured to be capable of executing programmed instructions stored in the memory to:

examine network coverage, network capacity, and network availability in the network in relation to one or more predefined parameters comprising usage type, service type, or amount of data already exchanged for a service.

4. The device of claim 1, wherein the processor is further configured to be capable of executing programmed instructions stored in the memory to:

periodically sample the terminal device to determine a location associated with the terminal device, wherein the periodic sampling comprises using a timer, monitoring behavior of the terminal device based on signaling messages, or by receiving input from an external monitoring system.

5. The device of claim 4, wherein processor is further configured to be capable of executing programmed instructions stored in the memory to:

register at least one tracking area comprising the location associated with the terminal device, wherein the registering comprises adding the at least one tracking area to a tracking area list;

determine, based on the periodic sampling, when the location associated with the terminal device is not in the tracking area list; and forward an update message to the server computing device when the periodic updating determines that the terminal device is not in the tracking area list.

6. The device of claim 5, wherein the processor is further configured to be capable of executing programmed instructions stored in the memory to:

determine the amount of data sent and received from the terminal device when the current location is not in the tracking area list.

7. The device of claim 1, the network comprises a Home Public Land Mobile (HPLM) network or a Visited Public Land Mobile (VPLM).

8. The device of claim 7, wherein the processor is further configured to be capable of executing programmed instructions stored in the memory to:
send a message to one of the plurality of network computing devices when the network to which the data communicated between the terminal device and at least one of the plurality of network computing devices will be redirected is an HPLM network or a VPLM network.

9. The device of claim 1 wherein processor is further configured to be capable of executing programmed instructions stored in the memory to:
create a list of preferred networks based on the scanning for a network;
receive update location requests from the terminal device to a network that is not in the list of preferred networks, the update requests comprising a Public Land Mobile Network (PLMN) identifier;
send an update message to at least one of the plurality of network computing devices when the PLMN identifier is consecutively received a predetermined number of times.

10. The device of claim 9, wherein processor is further configured to be capable of executing programmed instructions stored in the memory to:
send an update message to at least one of the plurality of network computing devices when the same PLMN identifier is not consecutively received, the update message comprising an indication of why the location update request was refused.

11. The device of claim 1, wherein the terminal computing device comprises a mobile subscriber device, or the plurality of network computing devices comprises a Mobility Management Entity (MME) or a Home Subscriber Server (HSS).

12. A method for maintaining a connection between a terminal device and a mobile network, executable by one or more traffic management devices with at least one processor executing the method, the method comprising steps to:
determine, by a first processor on the one or more traffic management devices, an amount of data during a session comprising the data communicated between a terminal device and at least one of a plurality of network computing devices;
cancel, by a second processor on the one or more traffic management devices, the session comprising the data communicated between the terminal device and the at least one of the plurality of network computing devices when the determined amount of the data communicated between the terminal device and at least one of the plurality of network computing devices during the session exceeds a predefined maximum threshold or is less than a predefined minimum threshold, wherein the terminal device is in an idle mode after the session is cancelled; and
scan, by a third processor on the one or more traffic management devices, for a network to which the data communicated between the terminal device and at least one of the plurality of network computing devices will be redirected when the terminal device is in the idle mode.

13. The method of claim 12, further comprising employing at least one of the first, second, or third processors on the one or more traffic management devices to:
verify home network coverage, network capacity, and network availability in a specific location and time, wherein the redirection of the data communicated between the terminal device and at least one of the plurality of network computing devices is performed after the verifying.

14. The method of claim 13, further comprising employing at least one of the first, second, or third processors on the one or more traffic management devices to:
examine network coverage, network capacity, and network availability in the network in relation to one or more predefined parameters comprising usage type, service type, or amount of data already exchanged for a service.

15. The method of claim 12, further comprising employing at least one of the first, second, or third processors on the one or more traffic management devices to:
periodically sample the terminal device to determine a location associated with the terminal device, wherein the periodic sampling comprises using a timer, monitoring behavior of the terminal device based on signaling messages, or by receiving input from an external monitoring system.

16. The method of claim 15, further comprising employing at least one of the first, second, or third processors on the one or more traffic management devices to:
register at least one tracking area comprising the location associated with the terminal device, wherein the registering comprises adding the at least one tracking area to a tracking area list;
determine, based on the periodic sampling, when the location associated with the terminal device is not in the tracking area list; and
forward an update message to the server computing device when the periodic updating determines that the terminal device is not in the tracking area list.

17. The method of claim 12, wherein the network comprises a Home Public Land Mobile (HPLM) network or a Visited Public Land Mobile (VPLM) network.

18. The method of claim 17, further comprising employing at least one of the first, second, or third processors on the one or more traffic management devices to:
send a message to the network computing device when the network to which the data communicated between the terminal device and at least one of the plurality of network computing devices will be redirected is an HPLM network or a VPLM network.

19. The method of claim 16, further comprising employing at least one of the first, second, or third processors on the one or more traffic management devices to:
determine the amount of data sent and received from the terminal device when the current location is not in the tracking area list.

20. The method of claim 12, further comprising employing at least one of the first, second, or third processors on the one or more traffic management devices to:
create a list of preferred networks based on the scanning for a network;
receive update location requests from the terminal device to a network that is not in the list of preferred networks, the update requests comprising a Public Land Mobile Network (PLMN) identifier;

send an update message to the MME when the same PLMN identifier is consecutively received a predetermined number of times.

21. The method of claim 20, further comprising employing at least one of the first, second, or third processors on the one or more traffic management devices to:
send an update message to the network computing device when the same PLMN identifier is not consecutively received, the update message comprising an indication of why the location update request was refused.

22. The method of claim 12, wherein the terminal computing device comprises a mobile subscriber device, or the plurality of network computing devices comprises a Mobility Management Entity (MME) or a Home Subscriber Server (HSS).

23. A non-transitory computer readable medium having stored thereon instructions for maintaining a connection between a mobile device of a subscriber and a mobile network comprising executable code which when executed by a processor, causes the processor to perform steps comprising:
determining an amount of data during a session comprising data communicated between a terminal device and at least one of a plurality of network computing devices; and
cancel the session comprising the data communicated between the terminal device and the at least one of the plurality of network computing devices when the determined amount of the data communicated between the terminal device and at least one of the plurality of network computing devices during the session exceeds a predefined maximum threshold or is less than a predefined minimum threshold, wherein the terminal device is in an idle mode after the session is cancelled; and
scanning for a network to which the data communicated between the terminal device and at least one of the plurality of network computing devices will be redirected when the terminal device is in the idle mode.

24. The medium of claim 23, further having stored thereon instructions that when executed by the processor cause the processor to perform steps further comprising:
verifying home network coverage, network capacity, and network availability in a specific location and time, wherein the redirection of the data communicated between the terminal device and at least one of the plurality of network computing devices is performed after the verifying.

25. The medium of claim 24, further having stored thereon instructions that when executed by the processor cause the processor to perform steps further comprising:
examining network coverage, network capacity, or network availability in relation to one or more predefined parameters comprising usage type, service type, or amount of data already exchanged for service.

26. The medium of claim 23, further having stored thereon instructions that when executed by the processor cause the processor to perform steps further comprising:
periodically sampling the terminal device to determine a location associated with the terminal device, wherein the periodic sampling comprises using a timer, monitoring behavior of the terminal device based on signaling messages, or by receiving input from an external monitoring system.

27. The medium of claim 26, further having stored thereon instructions that when executed by the processor cause the processor to perform steps further comprising:
registering at least one tracking area comprising the location associated with the terminal device, wherein the registering comprises adding the at least one tracking area to a tracking area list;
determining, based on the periodic sampling, when the location associated with the terminal device is not in the tracking area list; and
forwarding an update message to the server computing device when the periodic updating determines that the terminal device is not in the tracking area list.

28. The medium of claim 27, further having stored thereon instructions that when executed by the processor cause the processor to perform steps further comprising:
determine the amount of data sent and received from the terminal device when the current location is not in the tracking area list.

29. The medium of claim 23, wherein the network comprises a Home Public Land Mobile (HPLM) network or a Visited Public Land Mobile (VPLM) network.

30. The medium of claim 29, further having stored thereon instructions that when executed by the processor cause the processor to perform steps further comprising:
sending a message to the network computing device when the network to which the data communicated between the terminal device and at least one of the plurality of network computing devices will be redirected is an HPLM network a VPLM network.

31. The medium of claim 23, further having stored thereon instructions that when executed by the processor cause the processor to perform steps further comprising:
creating a list of preferred networks based on the scanning for a network;
receiving update location requests from the terminal device to a network that is not in the list of preferred networks, the update requests comprising a Public Land Mobile Network (PLMN) identifier;
sending an update message to at least one of the plurality of network computing devices when the same PLMN identifier is consecutively received a predetermined number of times.

32. The medium of claim 31, further having stored thereon instructions that when executed by the processor cause the processor to perform steps further comprising:
send an update message to at least one of the plurality of network computing devices when the same PLMN identifier is not consecutively received, the update message comprising an indication of why the location update request was refused.

33. The medium of claim 23, wherein the terminal computing device comprises a mobile subscriber device, or the plurality of network computing devices comprises a Mobility Management Entity (MME) or a Home Subscriber Server (HSS).

34. A method for maintaining a connection between a mobile device of a subscriber and a mobile network, the method comprising steps to:
determine, by a traffic management device, an amount of data during a session comprising data communicated between a terminal device and at least one of a plurality of network computing devices;
cancel, by the traffic management device, the session comprising data communicated between the terminal device and the at least one of the plurality of network computing devices when the determined amount of the data communicated between the terminal device and at least one of the plurality of network computing devices during the session exceeds a predefined maximum threshold or is less than a predefined minimum threshold, wherein the terminal device is in an idle mode after the session is cancelled; and scan, by the traffic management device, for a network to which the data communicated between the terminal device and at least one of the plurality of network computing devices will be redirected when the terminal device is in the idle mode.

* * * * *